United States Patent [19]
Katsuragi

[11] Patent Number: 5,311,326
[45] Date of Patent: May 10, 1994

[54] IMAGE-INFORMATION TRANSMISSION METHOD AND ITS CONTROL CIRCUIT

[75] Inventor: Shigeru Katsuragi, Chigasaki, Japan

[73] Assignee: Ricoh Company, Ltd., Tokyo, Japan

[21] Appl. No.: 853,283

[22] Filed: Mar. 18, 1992

[30] Foreign Application Priority Data

Mar. 20, 1991 [JP] Japan .................................. 3-80461

[51] Int. Cl.$^5$ ............................................. H04N 1/00
[52] U.S. Cl. ..................... 358/434; 358/442; 358/438; 358/405; 358/400
[58] Field of Search ............... 358/400, 401, 404, 405, 358/406, 407, 426, 432, 433, 434, 435, 436, 438, 439, 440, 442, 444, 445, 261.3, 262.1, 429; 379/100; 382/56

[56] References Cited
U.S. PATENT DOCUMENTS 5,041,915 8/1991 Hirota et al. ........................ 358/438

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

An image-information transmission method comprises a step prior to the transmission of image-information to be transmitted to another party destination, for scanning one portion of a transmission original at a predetermined line-density, and reading one portion of the image-information. Then it judges an optimum scanning line-density on the basis of the one portion of image-information that has been read, determines a transmission line-density of transmission image information, on the basis of the judged optimum scan line-density and information posted from an other party destination connected via circuit connected. An image-information transmission method transmits at the determined transmission line-density, of image-information scanned and read from the transmission original.

20 Claims, 7 Drawing Sheets

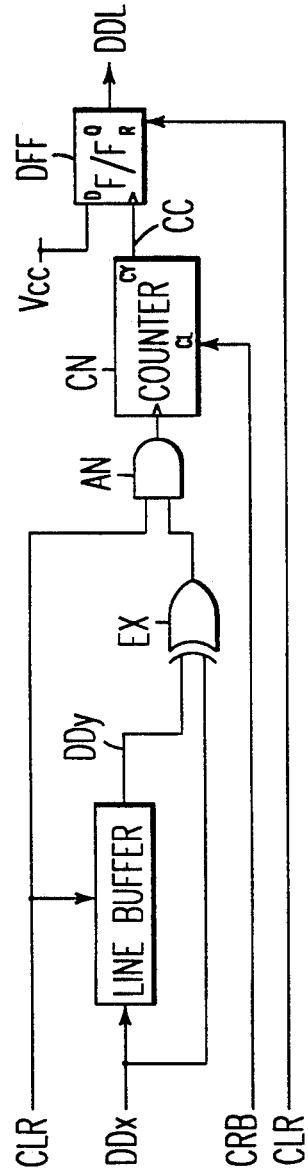
FIG. 7
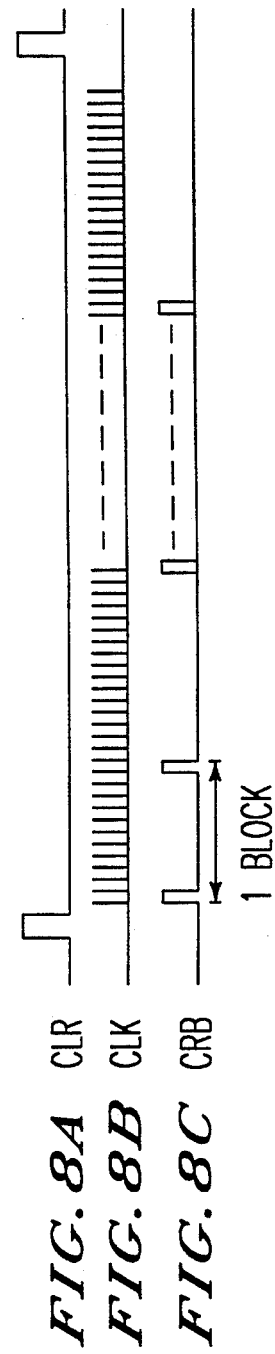
FIG. 8A CLR
FIG. 8B CLK
FIG. 8C CRB

IMAGE-INFORMATION TRANSMISSION METHOD AND ITS CONTROL CIRCUIT

BACKGROUND OF THE INVENTION

The present invention relates to a control method for a facsimile apparatus, and more particularly, to a method for controling a read mode for originals to be transmitted.

Normally, a group III facsimile apparatus performs control for the degree of redundancy suppression coding, and can transmit an A4 size original in approximately one minute. These group III facsimile apparatus have two types of read modes for originals. One of these read modes is a mode having a standard line resolution, and the other mode is a high resolution mode that has the line density in the direction of secondary scan set at twice that of the standard line resolution. When there is transmission, the read mode is set by the user on the transmission side.

In general, the high resolution mode is chosen when the contents of the image recorded on the original has fine characters for graphics; the standard line resolution mode is chosen for handwritten originals and the like. However, users unfamiliar with the operation of facsimile apparatus often use the same read mode indiscriminately.

The conventional method is to have the read mode for the original set by user operation on the side of transmission. Because of this, an image that should be read in the high resolution mode is sometimes read in the standard resolution mode, and sent. Further, some images may be sent in high resolution mode when standard mode is sufficient and this presents the problem that the transmission mode becomes unnecessarily long.

SUMMARY OF THE INVENTION

Accordingly, a general object of the present invention is to eliminate the problems described above as being associated with the conventional art, and to provide a novel and effective control method for a facsimile apparatus.

A specific object of the present invention is to provide a control method for a facsimile apparatus that can be simply operated by a user when an image is being transmitted.

Another specific object of the present invention is to provide a control method for a facsimile apparatus, the control method controlling the facsimile apparatus so as to transmit an image at a suitable resolution when an image is being transmitted.

Another object of the present invention is is to provide an image-information transmission method comprising:

a step prior to the transmission of image-information to be transmitted to another party destination, for scanning one portion of a transmission original at a predetermined line density, and reading one portion of the image-information;

a step for judging an optimum scan line density on the basis of the one portion of image-information that has been read;

a step for determining a transmission line density of transmission image-information, on the basis of the judged optimum scan line density and information posted from a transmission other party destination which is circuit connected; and a step for transmission at the determined transmission line density, of image-information which has been scanned and read from the transmission original.

BRIEF DESCRIPTION OF THE DRAWINGS

FIG. 7 is a block diagram showing another example of a circuit for judging the line density; and FIGS. 8A–8C are respectively operation waveform diagrams of the operation of the circuit of FIG. 7.

DETAILED DESCRIPTION OF THE PREFERRED EMBODIMENTS

The following is a description of the preferred embodiments, with reference of the appended drawings.

Figure 1:
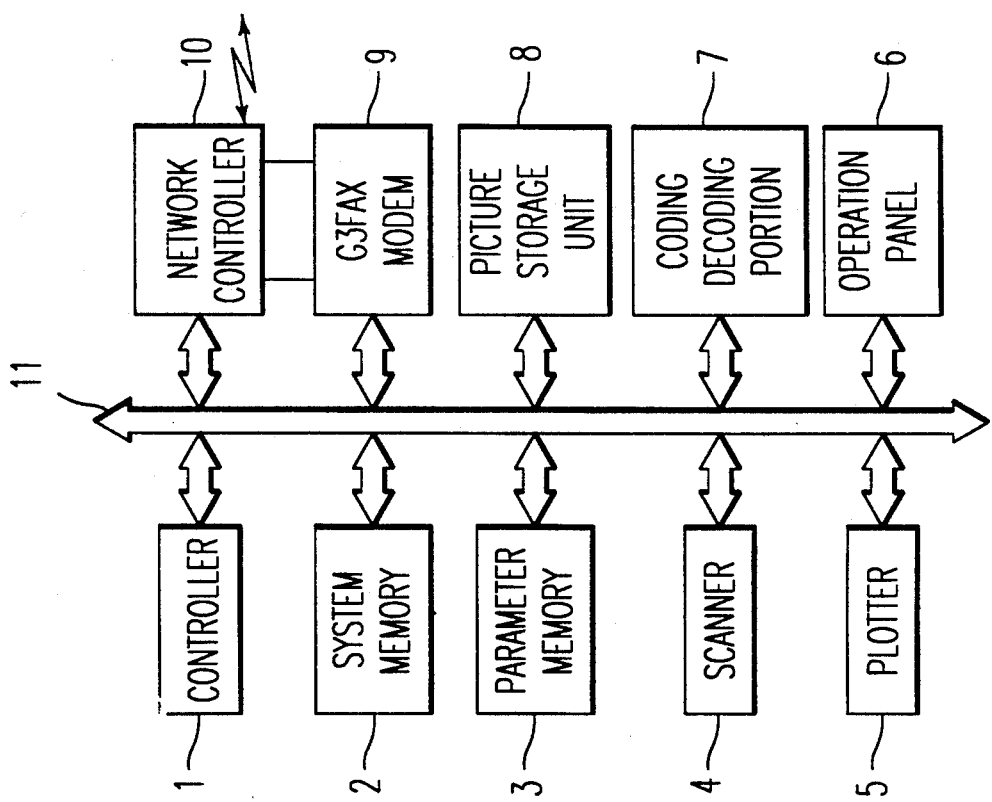
FIG. 1 is a view showing a systematic diagram of a group III type of facsimile apparatus.

In FIG. 1, a controller 1 uses a control processing program to perform control processing for the various portions of the facsimile apparatus, and also performs facsimile transmission control procedures using a processing program. A system memory 2 stores the various types of data necessary when the processing program and the control processing program are executed by the controller 1, and also constitutes a work area for transmission control of the controller 1. The parameter memory 3 stores various types of characteristic information in the group III facsimile apparatus. A plotter 5 records and outputs of the information at the required degree of resolution. An operation panel 6 comprises the various types of displays and operation keys for the operation of the facsimile apparatus. A coding/decoding portion 7 performs the coding compression of image signals, and also decodes the coded and compressed signals back into the original signals. An image storage apparatus 8 stores many item of image-information in the state where they are coded and compressed. A group III facsimile modem 9 realizes a group III facsimile modem mechanism. The group III facsimile modem 9 is provided with a low-speed modem function (V.21 MODEM) and a high-speed modem function (V.29 MODEM, V.27 ter MODEM) mainly for information transactions. A network control apparatus 10 is provided with an automatic send and receive function and connects the facsimile apparatus to a public telephone network. A system bus 11 is connected with the controller 1, the system memory 2, the parameter memory 3, the scanner 4, the plotter 5, the operation and the operation panel 6, the coding/decoding portion 7, the picture storage unit 8, the group III facsimile modem 9, and the network control apparatus 10. The communication of data between each of these elements constituting the apparatus are communicated by the system bus 11. In addition, data transactions between the network control apparatus 10 and the group III facsimile modem 9 are directly communicated without the system bus 11.

The following is a description of the process for judging the line density when a facsimile apparatus transmits image-information to another party. The process described below is an example of the control by processes executed by the software of the controller 1.

Figure 2:
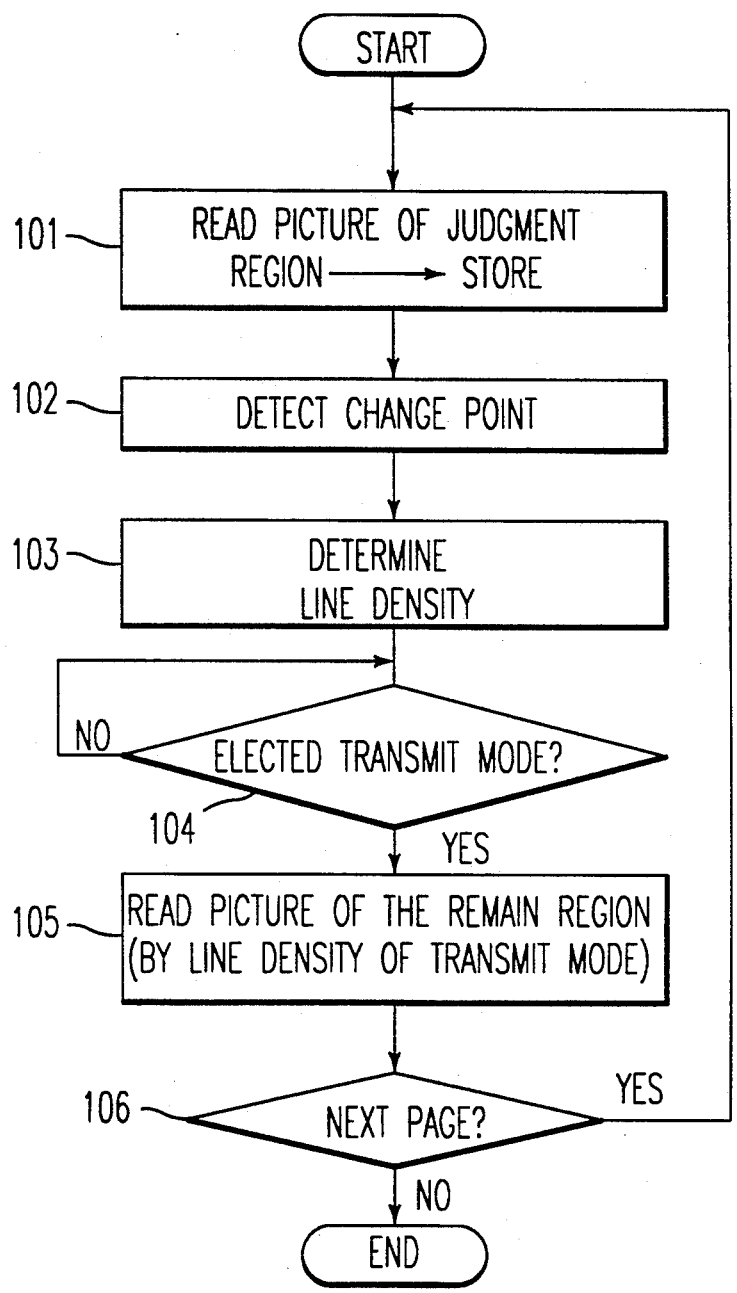
FIG. 2 is a flowchart for the process of reading an original when there is read input of an image of an original for transmission.

FIG. 2 shows the process executed after the transmission original is set in the scanner 4, and the specification of the destination and other specification operations necessary for transmission of the image-information are operated by the user, and the instruction to start transmission is input from the operation and operation panel 6. The controller 1 first sets the read line-density of the scanner 4 to high resolution. Then, the scanner 4 reads, under control of the controller 1, a predetermined number of lines (hereinafter called a judgment region) from the head of the first page of the transmission originals. These image signals from the scanner 4 are stored in the work area of the system memory 2 (step 101).

Of those image signals stored in the work area, two consecutive lines are read, and a check is made for whether or not there is a change in the image signals at the picture element positions of those two lines (step 102).

Then there is a judgment, according to the number of a points of change, of the types of read line densities of the transmission original being read. When the number of points of change of the picture element positions is greater than a predetermined number, the high resolution mode is used for the read line-density of the transmission original being read. On the other hand, if the number of change points is less than a predetermined number, then the standard resolution mode is used for the read line-density of the transmission original being read (step 103). The result of the process judging the appropriate degree of resolution is notified to the transmission processing means. The transmission process is a procedure of the communication of signals for transmission of the original.

In the above process, there is a standby step (step 104) executed until the scanner 4 receives the judgment results for the transmission mode which have been sent from the transmission process. When the line-density for the transmission mode has been sent and notified from the transmission process (Yes in step 104), the line-density notified by the transmission process is set in the scanner 4. The scanner 4 reads the remaining portion of the transmission original and inputs it to the system memory 2 (step 105).

When the controller 1 finishes the image read of a one page portion of the transmission originals, a check is made for whether or not there is a next page set in the scanner 4 (step 106). When there is a next page set (Yes in step 106) the controller 1 notifies the transmission process that there remains a page for transmission, and the process returns to step 101, and the consequent processing is repeated. In addition, when image reading is completed for all of the pages set in the scanner 4 (No in step 106), the scanner 4 ends the series of read operations.

Figure 3:
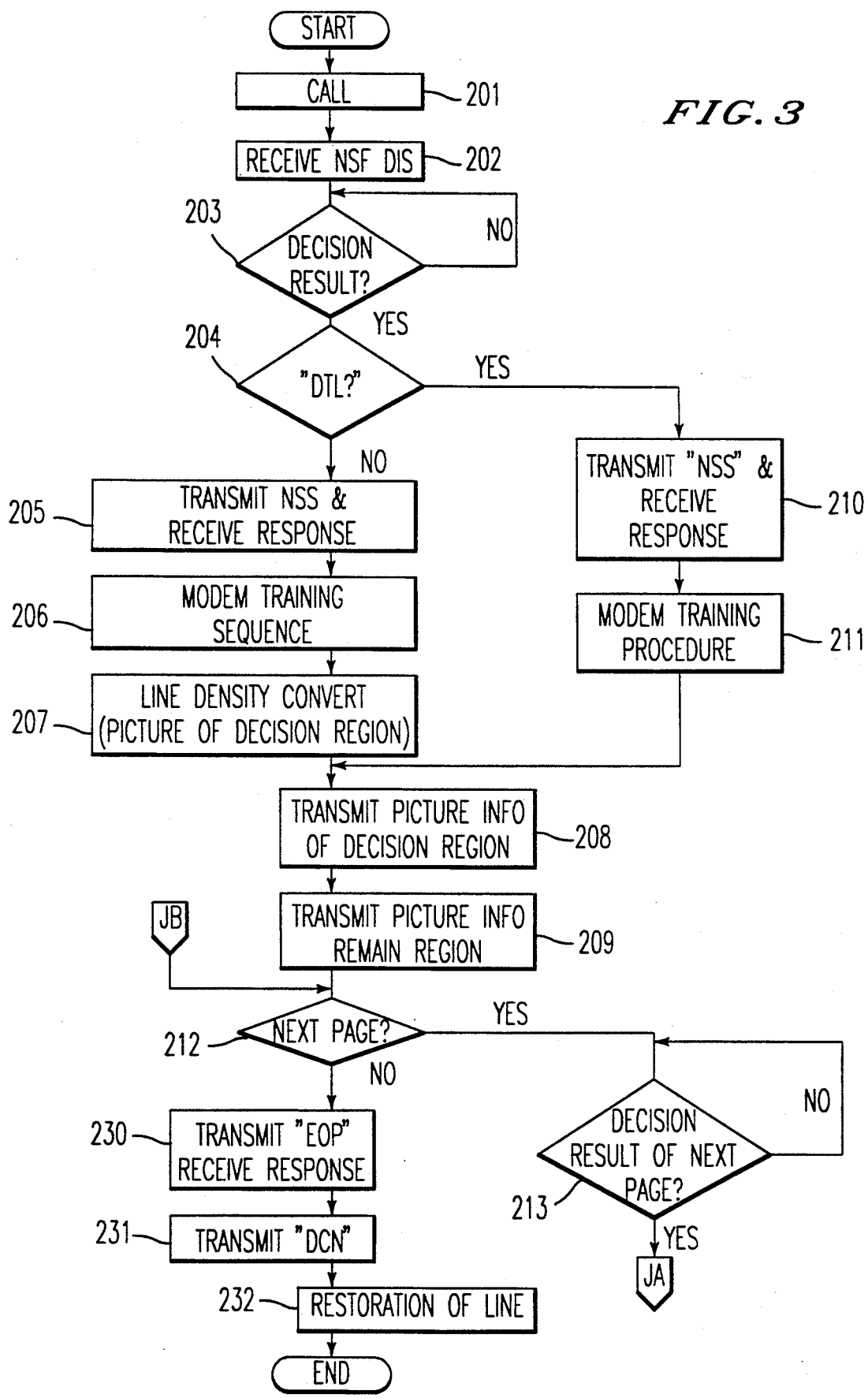
FIG. 3 and FIG. 4 are respecting flowchart of the process executed when there is transmission.
Figure 4:
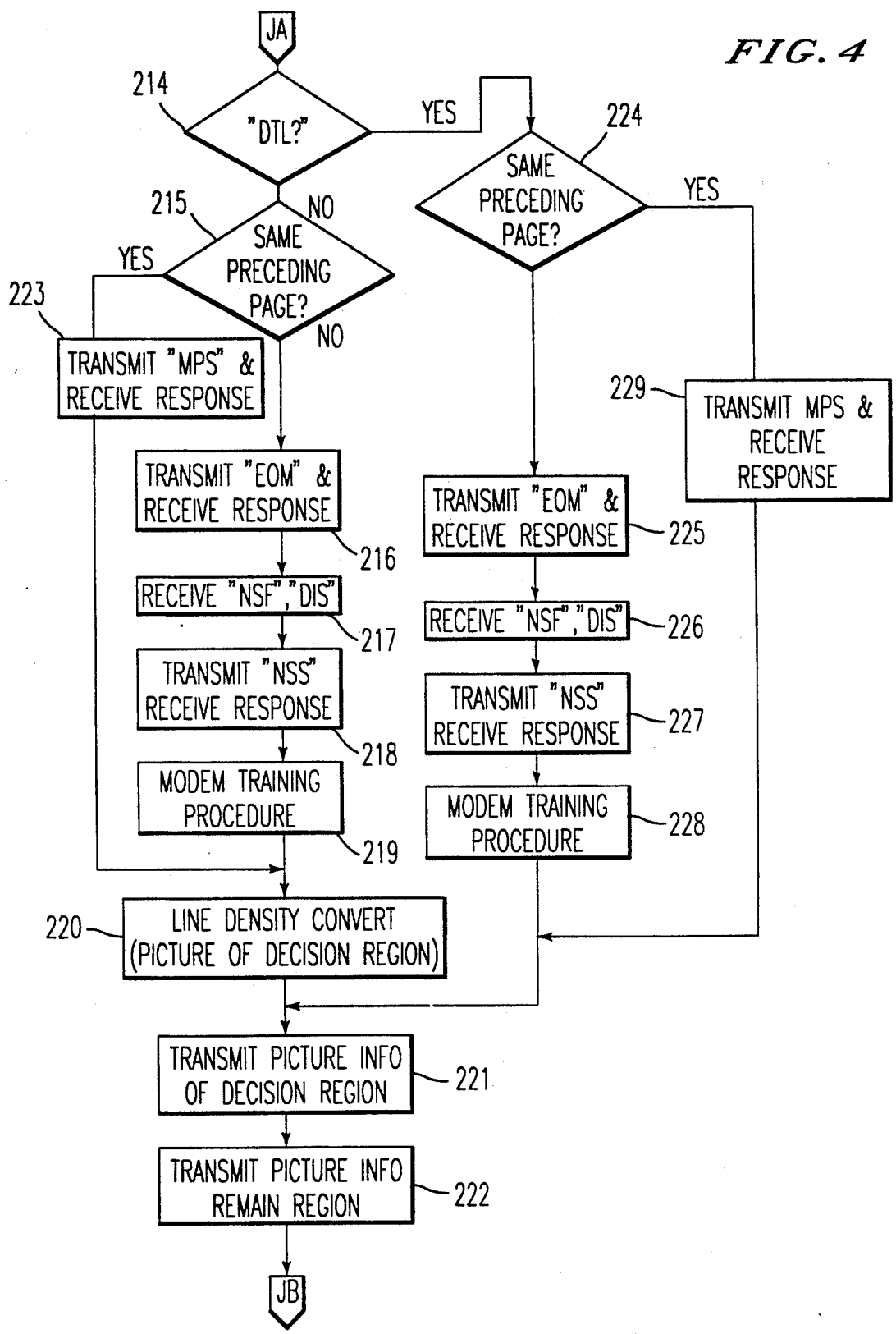

The following is a description, with reference to FIG. 3 and FIG. 4, of the process executed when image-information is transmitted from a facsimile apparatus to another party.

When the user inputs the transmission start instruction from the operation panel 6, the controller 1 calls the other party (step 201). The other party terminal transmits the Non-Standard Facilities (hereinafter termed the NSF) signal for function notification, and the Digital Identification signal (hereinafter termed the DIS) to the transmit side apparatus (step 202).

The system memory 2 of the transmit side apparatus holds the contents of the information field, and waits until the notification of judgment results for the line-density from the read process (No in step 203) of the original. When there is notification of judgment results for the line-density from the read process of the original (Yes in step 203), the controller 1 uses the judgment results for the notified line-density and the information relating to the line-density of the information field stored in the system memory as the basis for judging whether or not the line-density of the transmission mode for high resolution (hereinafter termed DTL) is to be used (step 204).

If the result of the judgement in step 204 is No, then the transmission mode line-density uses the standard definition (hereinafter termed STD). The controller 1 notifies reading function for the original for transmission that STD is to be used for the transmission mode, and sets the transmission functions, it then transmits this to the other party terminal and receives a response signal with respect to the sent information (step 205).

Then, at the modem speed set in step 205, the required modem training procedure is executed step 206). Parallel with the processing of step 206, the image signals of the judgment region that are stored in the work area of the system memory 2 undergo line-density conversion into STD image signals (step 207). This line-density conversion processing is, for example, logical sum processing for each picture element for a two continuous line portion, when the two continuous line portion are the processing units. This process is well known processing by those skilled in the art.

When the modem training processing and the line-density processing are finished, the image signals of the judgment region, which are stored in the work area, are coded and compressed by a predetermined coding method. The image-information obtained by the coding and compression is transmitted to the other party terminal (step 208).

After this, the image signals following the judgment region undergo the process of step 208 and are coded and compressed. The image-information obtained by this coding and compression is transmitted to the other party terminal (step 209). The image-information of a one page portion is thus transmitted to the other party terminal.

Moreover, the original read process uses the line-density (in this case, STD) set by the transmission process as the read resolution of the image read following the judgment region, and so it is possible for the image-information of the portion following the judgment region to be directly coded, compressed, and converted into image signals. In addition, the image signals obtained through the original read process are successively stored in a predetermined region of the work area of the system memory 2.

In addition, if it is judged that DTL is to be used as the line-density (Yes in step 204), then the controller 1 notifies the original read process that DTL is to be used as the transmission mode, sets the transmission function information in the information field of the NSS signals for notification of the transmission functions used at that time, and receives the NSS signal from the other party terminal (step 210). A required modem training procedure is then executed at a modem speed that has been set for the other party terminal (step 211). The image-information of a one page portion is then transmitted to the other party terminal.

In this manner, when the transmission of a one page portion of image-information is finished, the original read process checks for whether or not there is a notification that a next page has been set (step 212). If a next page has been set (Yes in step 212), then the controller 1 waits for the notification of the judgment results of the original read process for the line-density of the next page (No in step 213).

When there is the notification of the judgment results of the original read process for the line-density of the next page (Yes in step 213), the controller 1 uses the information relating to the line-density of the information field of the DIS or the NSF that is stored, and the notified line density judgment results from the original read process, as the basis for a judgment for whether or not DTL can be used as the line-density at that time (step 214). If DTL cannot be used (No in step 214), then a notification that STD is to be used as the line-density is sent to the original read process. At this time, a check is made for whether or not the line-density set is the same as for the previous page (step 215) and if it is the same (Yes in step 215) an "end of message" (hereinafter termed an EOM) signal is sent to the other party terminal and there is reception of a corresponding response signal from the other party terminal.

Then, the facsimile apparatus receives the NSF signal and the DIS (step 217) from the other party and sends an NSS signal having an information field identical to that of a DIS or an NSF signal, and receives an appropriate response signal from the other party (step 218). Required modem training procedures are then executed at the modem speed set when there was reception in step 218. In parallel with the modem training procedures, the image signals of the judgment region, stored in the work area of the system memory 2, undergo line-density conversion into STD image signals.

When the modem training processing and the line-density processing are finished, the image signals for the judgment region, which are stored in the work area are coded and compressed by the coding method set during modem training processing.

The compressed image-information obtained is transmitted to the other party terminal (step 221).

After this, the image signals read following the judgment region are coded and compressed. The image-information obtained from compression is sent to the other party terminal (step 222), and the image-information of a one page portion is transmitted to the other party terminal.

In addition, when STD is used as the line-density, and that line-density is the same as the line-density of the previous page (Yes in step 215), a multi-page signal (MPS) is sent to the other party terminal, and when the corresponding response signal is received from the other party terminal (step 233), the image-information of the judgment region is transmitted to the other party terminal, the image-information of the remaining region is transmitted, and then, the image-information of a one page portion is transmitted to the other party terminal (step 222).

In addition, when it is judged that DTL is to be used as the line-density (Yes in step 214), a notification that the DTL transmission mode is to be used is sent to the original read process. At this time, a check is made for whether or not the set line-density is the same as for the previous page (step 224) and if it is (Yes in step 224), then the EOM signal is sent to the other party terminal, and the corresponding response signal corresponding to the EOM signal is received from the other party terminal (step 255).

Then, when the facsimile apparatus receives the NSF signal and the DIS from the other party terminal (step 226), an NSS signal having an information field identical to that the NSF or the DIS is sent to the other party terminal, the response signal is received (step 227) and the modem speed set during reception from the other party terminal is used to transmit the information of that page to the other party terminal.

In addition, when DTL is used as the line-density, and that line-density is the same as the line-density of the previous page (Yes of step 224), the multi-page signal (hereinafter termed an MPS) is sent to the other party terminal and the corresponding response signal is received from the other party terminal (step 229). After this, the processing of step 221 is executed and the image-information of a one page portion is transmitted.

In this manner, when the transmission of a one page portion of image-information is finished, the process returns to step 212, and the processing relating to the following page is executed in the same manner as described above.

In addition, when the image transmission of all transmission originals is finished (No in step 212), and "end of procedure" (hereinafter termed an EOP) signal is sent to the other party terminal, the corresponding procedure signal is received (step 230), the "disconnect" (hereinafter termed DCN) signal is sent to the other party terminal (step 231) and the circuit is restored (step 232) and the series of image-information transmission operations ends.

With a configuration as described above, when the user transmits image-information, the transmission originals are set in the scanner 4, and an operation specifying the other party terminal is operated, using the operation panel 6. When the user operates the start key (not shown in the figure) of operation panel 6, and gives the instruction for the start of image-information transmission operation, the call operation beings, and the scanner 4 starts the read operation of the first page of the original transmission.

When reading of the image of the judgment region on the first page of the transmission originals ends, a judgment operation for the line-density is executed. The relationship between the line-density judgment results and the receiving performance of the other party terminal is used to judge the line-density to be set for image-information transmission.

When the setting results of the line-density are STD, the image signals of the judgement region undergo line-density conversion from DTL to STD, and then the image signals read after the judgment region undergo line-density conversion and are coded and compressed into image-information by a predetermined set coding method. They are then transmitted to the other party terminal. In addition, when the setting results are DTL, the image signals of the judgment region are coded and compressed, and that image-information is sent to the other party terminal.

The set line-density is transmitted to the other party terminal and to the scanner 4, and the image of the portion, read after the judgment region is read at the set line-density as notified to the reading function. The obtained image signals are coded and compressed, and the image-information obtained is transmitted to the other party terminal.

When transmission for the first page of the transmission originals ends, the same operation is operated for the following pages, and transmission is operated for the image-information of the respective pages.

In this manner, the user needs not set the read line-density for the transmission originals for each transmission. As per the current invention a line-density suitable for the read operation is judged for each page even if the user does not input a line-density, the judgement results and the ability of the other party terminal are used to automatically set the line-density. Accordingly, the operation when there is transmission becomes more simple and furthermore, the image of the received originals obtained at the other party terminal is appropriate.

Figure 5:
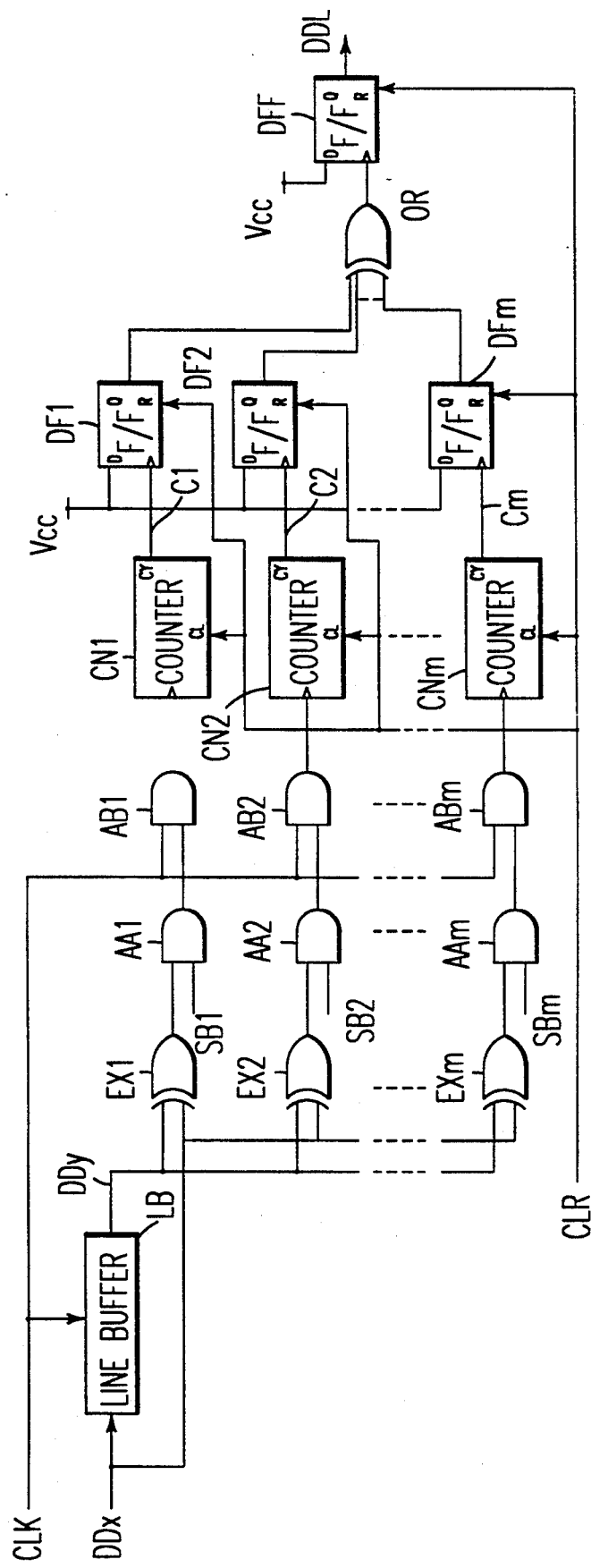
FIG. 5 is a block diagram showing a circuit for judging the line density.

In the embodiment described above, the judgement of the read line-density for the transmission originals is judged by the software of the controller 1, but alternatively this judgment can also be operated by a circuit, one example of which is shown in FIG. 5.

The circuit shown in the example of FIG. 5 first divides one line into m number of blocks. Then, the total number of picture elements for which the contents (black & white picture elements) of the image signals are in agreement is totalled for the respective picture elements of two line portions. If it is judged that this total number is greater than a required value, the judgment operation is operated in block units, and when there is more than one block for which the judgment results are true, the read line-density for the image of that line is judged as being the DTL line-density.

In FIG. 5, the image signal DDx for DTL output in sync with the picture element CLK (refer to FIG. 6B), and the signal CLK are applied to the line buffer LB that has a storage capacity of one line. The signal DDx is also supplied to one of the input terminals of the exclusive logical sum circuit EX1-EXm.

The image signals DDx are successively input to the line buffer LB in synchronizing with the picture element clock CLK, and the output signals of the line buffer LB are applied to the exclusive logical sum circuit EX1-EXm as the image signals DDy the image of a line of one line prior to the image signals DDx.

The exclusive logical sum circuit EX1-EXm takes the logical sum of the image signals DDx currently read and output and the image signals DDy of one line prior to the same picture element position.

When the exclusive logical sum circuits EX1-EXm show non agreement for each logical sum circuit, that is, when there is non-agreement for the contents of the image signals of a two line portion for the same picture element position, it is judged that there is DTL, and the output signals of the exclusive logical sum circuit rise to the logical high level, and those output signals are applied to one of the input terminals of the respective AND circuits AA1-AAm.

Figure 6:
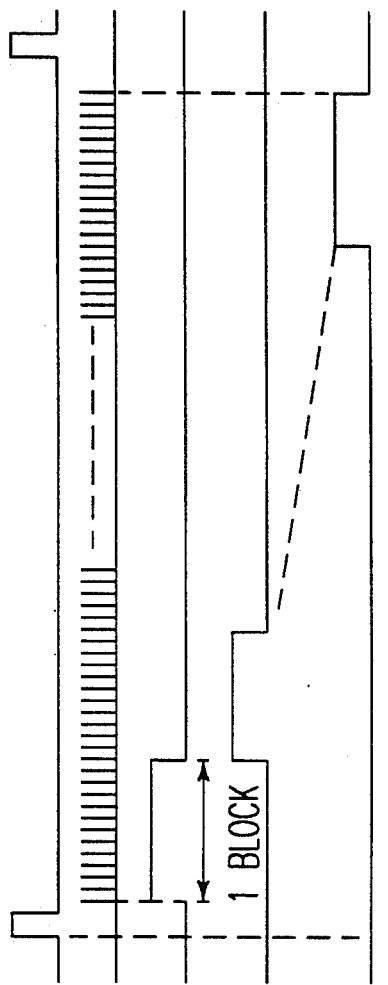
FIGS. 6A–6E are respectively an operation waveform diagrams of the operation of the circuit of FIG. 5.

To the other input terminals of the AND circuit AA1-AAm are applied the block selection signal SB1-SBm (FIGS. 6C-E) that rise to the logical high level at the timing of each block. Shown in FIGS. 6C-E. Each of the AND circuits AA1-AAm becomes the high level (operating status) for the period that the respective selector signals SB1-SBm rise to the logical high level, that is, for the period that the image signals DDx are being output at the timing of one block shown in FIGS. 6C-E. The output signal of the AND circuits AA1-AAm rise to the logical high level when it can be judged that the picture elements of each block shown in FIGS. 6C-E are DTL. The output signal of the AND circuits AA1-AAm is applied to the other of the input terminals of the AND circuits AB1-ABm.

The picture element clock CLK is applied to the input terminal of the AND circuits AB1-ABm, and accordingly, during the period that the output signals of the AND circuit AA1-AAm have risen to the logical high level, the AND circuit AB1-ABm can operate and so the picture element clock CLK is applied to the respective counters CN1-CNm via the AND circuits AB1-ABm.

The counters CN1-CNm total the picture element clock CLK output via the AND circuits AB1-ABm, and at the time when that total value has reached a value corresponding to the threshold for judging that the respective blocks B1-Bm are a DTL block, the carrier signals C1-Cm are output and applied to the clock input terminals of the respective D flip-flops DF1-DBm.

Signals of the logical high level are applied to the data input terminals of the D flip-flops DF1-DFm, and at the time the clock input terminal becomes the logical high level, the D flip-flop rises to the logical high level. The output signals of the flip-flops DFF are output as DTL signals DDL.

In addition, the counters CN1-CNm, D flip-flop DF1-DFm and DFF have their respective counters cleared by the clear signal CLR (FIG. 6A) output in line units.

With the constitution described above, the clear signal CLR is output prior to the input of the image signals DDx of a one line portion. The counters CN1-CNm, D flip-flops DF1-DFm are cleared by this signal, and the total values of the counters CN1-CNm are initialized. Furthermore, the status of the D flip-flops DF1-DFm, DFF is initialized to the logical low level.

In this state, at the same time as the image signal DDx of a one line portion is input in synchronizing with the picture element clock CLK, the block selector signals SB1-SBm successively rise to the logical high level in accordance with the respective block periods.

The timing of the DTL picture element is different for the image signals DDx and the contents (picture elements) of the image signals DDy for one line prior, and so the output of the exclusive logical sum circuit EX1-EXm changes to the logical high level. As a result, at the timing when the DTL picture elements are output for the respective one blocks in FIGS. 5C-E, the output signals of the AND circuits AA1-AAm rise to the logical high level. Hence, at the timing of the logical high level when the DTL picture elements of each respective block shown in FIGS. 6C-E are output, the picture element clock CLK is output to the counters CN1-CNm via the AND circuits AB1-ABm. Thus, the number of DTL picture elements for each blocks in FIGS. 6C-E is totalled by the counters CN1-CNm. Here, for each blocks for which the number of DTL is greater than a predetermined number, the total value of the counters CN1-CNm exceeds the threshold value. Thus, the carry signals C1-Cm are output, and the D flip-flops DF1-DFm change from the logical low level to the logical high level.

Accordingly, when there is more than a predetermined number of DTL picture elements detected for any of the blocks B1-Bm, the output signals of the OR circuit OR rise to the logical high level, and so the D flip-flop DFF changes to the logical high level. As a result, the DTL signal DDL rises to the logical high level to express DTL.

In this manner, in the state where a one line portion of image signals DDy are stored beforehand in the line buffer LB, there is a check for the degree of resolution signals DDL, at the point when the read has been finished, for the image of a one line portion. The contents of the line read are judged by the resolution signal DDL for whether or not the image DTL read is appropriate. This judgement is operated for each line of the image of the judgment region. When there is more than a required number of lines for which the DTL signal DDL has changed to the logical high level, the read line-density of the transmission originals read is judged to be DTL.

FIG. 7 is a view showing another embodiment of the circuit of FIG. 5. In FIG. 7, those portions that correspond to FIG. 5 are shown with corresponding numerals. In FIG. 7, the DTL image signals DDx are output in synchronizing with the picture element clock CLK (FIG. 8B). The image signals DDx are applied to the line buffer LB that has a storage capacity of a cone line portion and are also applied to one of the input terminals of the exclusive logical sum circuit EX.

In addition, the image signal DDy that was output from the line buffer LB is applied to the other terminals of the exclusive logical sum circuit EX. The exclusive logical sum circuit EX has applied to it both the image signals DDx of the line currently being read and output, and the image signals DDy of the line one line prior to the same picture element position. The exclusive logical sum circuit EX judges that the resolution is DTL when the contents of the image signals of the two line portions for the same picture element position are not in agreement. When this occurs, the output signal of the exclusive logical sum circuit EX rises to the logical high level, and furthermore, is input to one of the input terminals of the AND circuit AN. The picture element clock CLK is input to the other of the input terminals of the AND circuit. Accordingly, the AND circuit AN becomes operational for the time the output signal of the exclusive logical sum circuit EX remains in the logical high level. Hence, the picture element clock CLK is input to the respective counters via the AND circuit AN. The counter CN counts the number of clock signals CLK output via the AND circuit AN. At the time when the total value counted by the counter CN has reached a value that corresponds to the threshold value for judging that the blocks are a DTL block, the counter CN outputs the carry signal CC. This carry signal CC is applied to the clock input terminal of the D flip-flop DFF.

In addition, the counter CN has its contents cleared by the clear signal CRB (FIG. 8C) output at the start of the timing of respective blocks. The D flip-flop DFF has its contents cleared by the clear signal CLR (FIG. 8A) output in line units.

In the same manner as the circuit shown in FIG. 5, in the state where the image signals DDy of a one line portion have been stored beforehand in the line buffer LB, at the time when the read of an image of a one line portion has finished, the circuit shown in FIG. 7 checks the DTL signal DDL and judges whether the contents of that read line are the contents of an image that should be read by DTL.

The circuit shown in FIG. 7 inputs to the exclusive logical sum circuit EX the highest order bit of the multi-value image signals of the same picture element, along with the next highest high order bit so that a judgment is made for whether or not the read image is a halftone image. In other words, the circuit shown in FIG. 7 can constitute an image-region judgment circuit.

In the embodiment described above, the transmission image-information as notified by the transmission procedures with the other party terminal each time there is transmission operation, are used as the basis for judging the degree of resolution of the other party terminal but when various types of terminal functions are stored for the respective terminals, then the transmission operation can use the resolution judged and stored during the previous transmission procedure.

As described above, the present invention automatically judges for whether DTL or STD is to be used when an image of a transmission original is read. Accordingly, it is necessary for the line-density to be set with respect to each page when there is transmission. In addition, when there is transmission, it is also possible to select the line-density of image-information in accordance with the functions of the other party terminal and so it is possible to have efficient image-information transmission.

The present invention is not limited to the above described embodiments, and variation may be made without departing from the scope of the invention.

What is claimed:

1. An image-information transmission method comprising:
    a step for scanning one portion of a transmission original at a predetermined line-density to obtain one portion of image-information;
    a step for judging an optimum scanning line-density using said one portion of image-information that has been scanned;
    a step for connecting with an object party which transmits descriptive information thereof;
    a step for determining a transmission line-density of transmission image information, using said judged optimum scan line-density and said descriptive information transmitted from said object party; and
    a step for transmission, at said determined transmission line-density, of image-information scanned and read from said transmission original.

2. An image-information transmission method comprising:
    a step prior to transmission, for scanning a header portion of a transmission original at a predetermined scanning line-density, and storing said header portion of image-information in a memory;
    a step for judging an optimum scanning line-density using said read header portion;
    a step for determining a transmission line-density of transmission image-information posted from an object party, after a connection therewith;
    a step for reading said stored image-information header portion from said memory, and transmitting the read stored information header portion at said predetermined line-density, when the determined transmission line-density is in agreement with said predetermined scanning line-density; and
    a step for reading said stored image-information header portion from said memory, converting the read image-information header portion into said determined line-density which was determined in said step for determining the transmission line density, and transmitting the converted image information header portion, when the determined transmission line-density is not in agreement with said predetermined scanning line-density.

3. An image-information transmission method as claimed in claim 2 further comprising:
- a step, performed after said image-information header portion has been transmitted to said object party, for scanning a remaining portion of said original for transmission at a scanning line-density at which said header portion was scanned, and storing image-information of said remaining portion in said memory, and
- a step for reading said stored remaining portion of image-information from said memory and transmitting the read remaining portion to said object party at the transmission line-density at which said header portion was transmitted.

4. An image-information transmission method as claimed in claim 3, wherein
said step for storing a remaining portion of said transmission originals, codes and compresses image signals of said remaining portion of said transmission originals, and stores the coded and compressed image signals in the memory.

5. An image-information transmission method as claimed in claim 2, wherein
said step for judging said optimum scanning line-density checks for changes in image signals by checking respective picture element positions for two continuous lines of image-information of said scanned header portion, and judges the optimum scanning line-density is a high resolution when a number of points of changed picture elements is equal to or greater than a predetermined number, and judges the optimum scanning line-density is a standard resolution when a number of points of changed picture elements is less than a predetermined number.

6. An image-information transmission method as claimed in claim 2, wherein
said step for determining a transmission line-density determines the transmission line-density to be one of a high resolution and a standard resolution using an information field in the transmission image-information posted from said object having information relating to a line density of said signals and the judged result of said scanning line-density from said step for judging.

7. An image-information transmission method as claimed in claim 2, wherein
when there is non-agreement between said predetermined line-density and said determined transmission line-density, a line-density conversion process is performed which calculates a logical sum of picture elements of a two continuous line portion of the image-information, before said step which transmits image-information.

8. An image-information transmission method as claimed in claim 2, wherein
said step for determining said transmission line-density determines the transmission line-density to be a line-density known to be used by the object party.

9. An image-information transmission method comprising:
- a step for scanning and reading each line a header portion of an original for transmission;
- a step for storing image-signals for each line read;
- a step for comparing contents of a picture element position of image signals of a line currently being scanned and read, at a picture element position which is a same position as a position of stored image signals for one line prior to said stored images and for outputting a high level signal when a scanning line-density is to be high resolution when there is non-agreement said comparison, and outputting a low level signal when a scanning line-density is to be standard resolution when there is agreement in said comparison;
- a step for outputting a picture element clock signal at a same time as a time of the output of picture elements of read image-information of a block period when said high level signal is output;
- a step for counting a number of said picture element clock signals of said block period during which said high level signal is output; and
- a step for transmitting a header portion of said original for transmission at high resolution, to an object party destination when a counter value of said counted picture element clock signals has reached a predetermined value.

10. An image-information transmission method as claimed in claim 9, wherein
said step for outputting of high level signals takes a logical sum of image signals of a line currently being scanned and read at a picture element position the same as stored image signals for one line prior.

11. An image-information transmission method as claimed in claim 9, wherein
said step for outputting of high level signals further comprises the step of taking a logical sum of image-color data signals of a line currently being scanned and read at a picture element position which is a same as a position of stored image signals for one line prior.

12. An image-information transmission method as claimed in claim 11, wherein
the step that takes said logical sum, inputs to an exclusive logical sum circuit, a highest order bit of multi-value image signals of each picture element, and inputs also a next highest bit after said highest order bit, and judges whether or not read image-information is of a half-tone image.

13. An image information transmission method as claimed in claim 9, wherein
said step for outputting of picture element clock signals quantizes and outputs said high level signals.

14. An image-information transmission method as claimed in claim 9, wherein
said counting step sets an initial count value when said low level signals are output.

15. An image-information transmission control circuit comprising:
- a read means for scanning a head portion of a transmission original;
- a storage means for storing image signal of input line in synchronizing with a picture element clock,
- an exclusive logical sum circuit for comparing contents of picture elements of the same position of picture elements of one prior line and contents of picture element a plural number of other lines by logical sum, and judging whether or not there is agreement of said contents, outputting high level signals when there is non-agreement, and outputting low level signals when there is an agreement;
- a clock output means for outputting picture element clock signals at a time of the output of picture elements of image information read at a clock period at which said high level signals are output from said exclusive logical sum circuit;

an AND circuit for passing said clock for said picture element clock signal period for which said high level signals are output;

a counter for counting said picture element clock signals input from said AND circuit, and outputting a carry signal to notify of high resolution at the point, when a count value has attained a threshold value for judgment of a line-density; and an output means for controlling said carry signals obtained from said counter, and for outputting signals of high resolution, and then clearing a counter value of said counter.

16. An image-information transmission control circuit as claimed in claim 15, wherein said exclusive logical sum circuit judges non-agreement of image-color data signals of a line that is being currently scanned and read at a picture element position which is a same position as a position of stored image signals for one line prior.

17. An image-information transmission control circuit as claimed in claim 15, wherein said output means includes an OR circuit that generates high level signals when said carry signals are output from said counter.

18. An image-information transmission control circuit as claimed in claim 15, wherein said output means includes a first D flip-flop circuit that outputs signals of high resolution when rise signals are output from said OR circuit.

19. An image-information transmission control circuit as claimed in claim 15, wherein
    said counter sets a counter value to an initial value when low level signals are output from said exclusive logical sum circuit.

20. An image-information transmission control circuit as claimed in claim 15, wherein
    said exclusive logical sum circuit inputs a highest order bit of multi-value image signals of each picture element, and a next highest order bit after said highest order bit, and judges whether or not read image-information is of a half-tone image.

* * * * *